(12) United States Patent
Oe et al.

(10) Patent No.: US 9,330,712 B2
(45) Date of Patent: May 3, 2016

(54) DATA CONVERSION METHOD ON STORAGE MEDIUM, APPARATUS AND PROGRAM

(75) Inventors: Naoyuki Oe, Tokyo (JP); Takahiro Shima, Tokyo (JP); Yoshiyuki Matsumoto, Tokyo (JP); Hiroki Shima, Tokyo (JP); Yusuke Minamii, Tokyo (JP); Takahiro Takeda, Tokyo (JP)

(73) Assignee: Humming Heads Inc., Tokyo (JP)

( * ) Notice: Subject to any disclaimer, the term of this patent is extended or adjusted under 35 U.S.C. 154(b) by 0 days.

(21) Appl. No.: 13/564,409

(22) Filed: Aug. 1, 2012

(65) Prior Publication Data

US 2012/0303975 A1 Nov. 29, 2012

Related U.S. Application Data

(63) Continuation of application No. 12/491,865, filed on Jun. 25, 2009, now abandoned, which is a continuation of application No. PCT/JP2008/050907, filed on Jan. 23, 2008.

(30) Foreign Application Priority Data

Jan. 24, 2007 (JP) .................................. 2007-039969

(51) Int. Cl.
*H04L 29/06* (2006.01)
*G11B 20/00* (2006.01)
(Continued)

(52) U.S. Cl.
CPC ........ *G11B 20/00507* (2013.01); *G06F 21/602* (2013.01); *G06F 21/6218* (2013.01); *G11B 20/0021* (2013.01); *G11B 20/00086* (2013.01); *G11B 27/034* (2013.01); *G11B 27/322* (2013.01); *G11B 20/1217* (2013.01);
(Continued)

(58) Field of Classification Search
USPC .......................................................... 713/193
See application file for complete search history.

(56) References Cited

U.S. PATENT DOCUMENTS 5,796,825 A 8/1998 McDonnal
5,999,622 A 12/1999 Yasukawa
(Continued)

FOREIGN PATENT DOCUMENTS

JP 2001-338468 A 12/2001
JP 2004-199229 A 7/2004
(Continued)

OTHER PUBLICATIONS

International Search Report dated Apr. 25, 2008, issued in corresponding International Application No. PCT/JP2008/050907, filed Jan. 23, 2008.
(Continued)

*Primary Examiner* — Christopher Brown
(74) *Attorney, Agent, or Firm* — Christensen O'Connor Johnson Kindness PLLC

(57) ABSTRACT

In a data conversion auxiliary module which is at a higher level than a file system in a disk management hierarchy, data stored in a storage medium, which becomes an object, is successively accessed. Then, a data conversion module captures a sector-unit access request to a device driver from the file system, converts data of a sector which is returned from the device driver, and writes the conversion data in the sector. Thereby, data conversion can be executed on a specific region of the storage medium, which is associated with the data in the storage medium.

8 Claims, 6 Drawing Sheets

(51) Int. Cl.
*G06F 21/60* (2013.01)
*G06F 21/62* (2013.01)
*G11B 27/034* (2006.01)
*G11B 27/32* (2006.01)
*G11B 20/12* (2006.01)

(52) U.S. Cl.
CPC . *G11B2020/1232* (2013.01); *G11B 2220/2516* (2013.01)

(56) References Cited

U.S. PATENT DOCUMENTS

| | | | |
|---|---|---|---|
| 7,746,738 | B2 | 6/2010 | Ueda |
| 7,925,017 | B2 | 4/2011 | Shirai |
| 8,127,149 | B1 * | 2/2012 | Nachenberg ................. 713/193 |
| 2005/0204154 | A1 * | 9/2005 | Osaki ............................ 713/193 |
| 2007/0143459 | A1 | 6/2007 | Batteram |
| 2008/0155276 | A1 * | 6/2008 | Chen et al. .................... 713/193 |
| 2008/0162735 | A1 | 7/2008 | Voigt |

FOREIGN PATENT DOCUMENTS

| | | |
|---|---|---|
| JP | 2004-201038 A | 7/2004 |
| JP | 2005-100255 A | 4/2005 |
| JP | 2005-172866 A | 6/2005 |
| JP | 2006-033326 A | 2/2006 |
| JP | 2006-185083 A | 7/2006 |
| WO | 2007/002438 A1 | 1/2007 |

OTHER PUBLICATIONS

International Preliminary Report on Patentability mailed Aug. 6, 2009, in corresponding Application No. PCT/JP2008/050907, filed Jan. 23, 2008.
Notice of Reasons for Rejection (JP) mailed May 24, 2011, issued in corresponding Japanese Patent Application No. 2008-555093, 9 pages.
Supplemental European Search Report mailed Jan. 31, 2011, issued in corresponding European Application No. EP 08703737, filed Jan. 23, 2008, 9 pages.
Communication Pursuant to Article 94(3) EPC mailed Aug. 6, 2014, issued in corresponding European Application No. 08 703 737.0, filed Jan. 23, 2008, 8 pages.

* cited by examiner

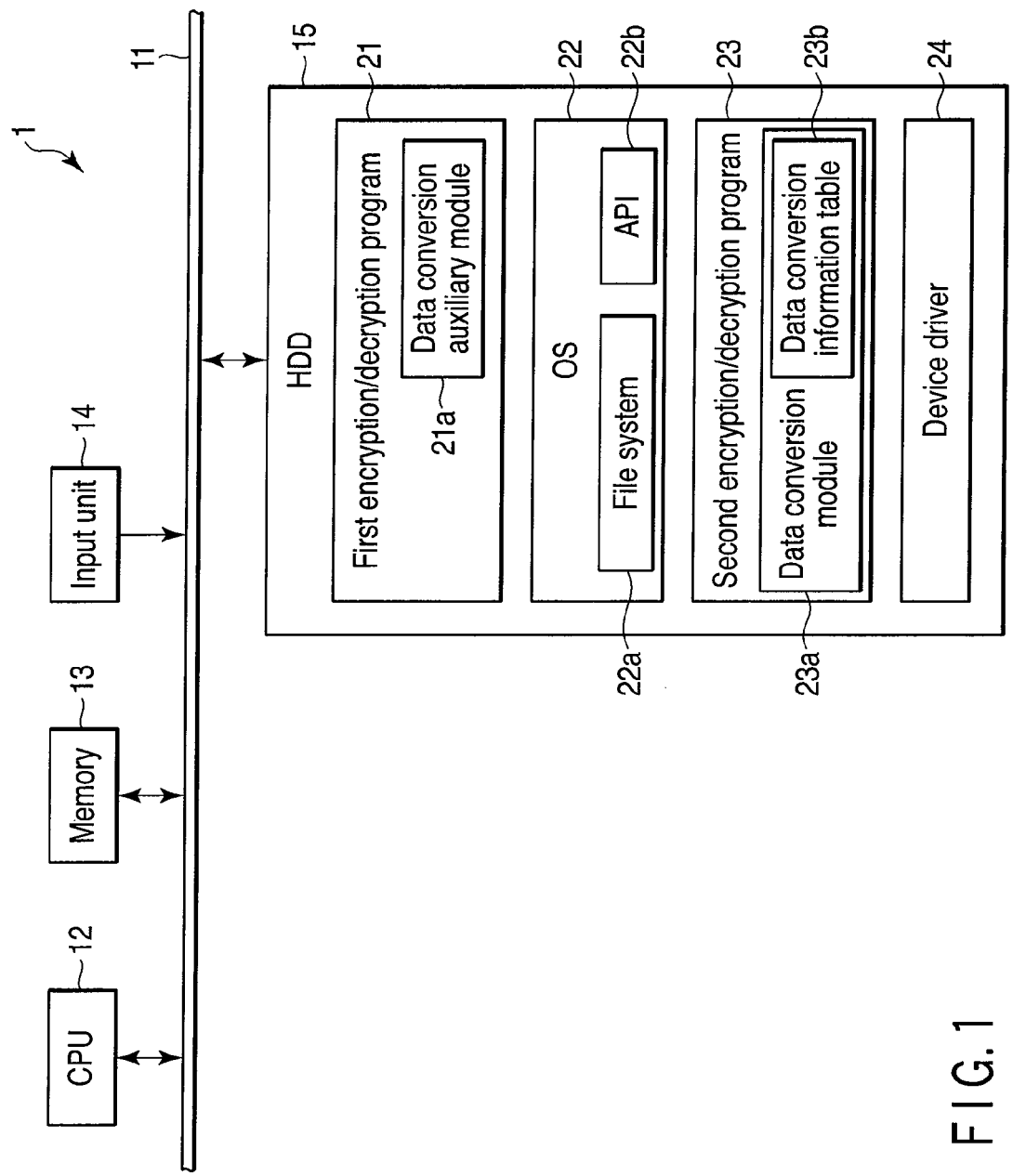
F I G. 1

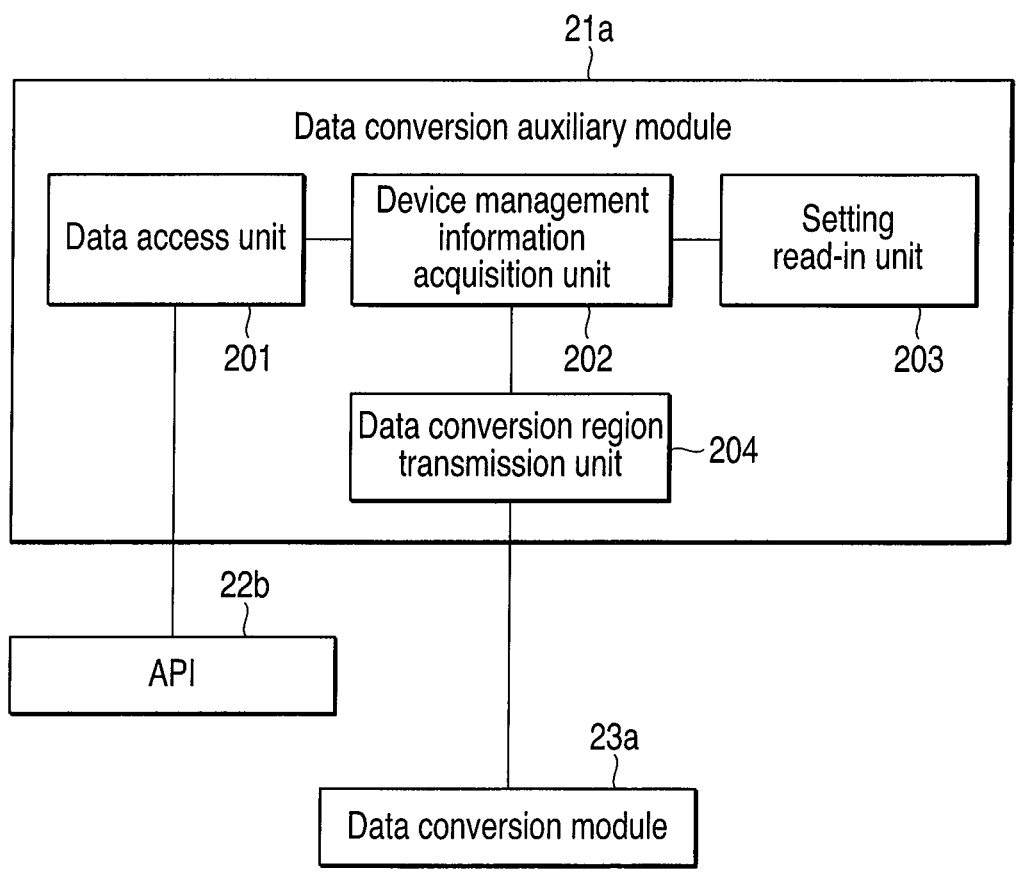
F I G. 2

| Data conversion information table | | | |
|---|---|---|---|
| Sector number | Data conversion object flag | Data conversion flag |
| 1 | 1 | 1 |
| 2 | 1 | 1 |
| 3 | 1 | 0 |
| 4 | 1 | 1 |
| 5 | 1 | 0 |
| 6 | 0 | 0 |
| 7 | 0 | 0 |
| ... | ... | ... |

FIG. 4

DATA CONVERSION METHOD ON STORAGE MEDIUM, APPARATUS AND PROGRAM

CROSS-REFERENCE TO RELATED APPLICATIONS

This application is a continuation of U.S. application Ser. No. 12/491,865, filed Jun. 25, 2009, which is a Continuation Application of PCT Application No. PCT/JP2008/050907, filed Jan. 23, 2008, which was published under PCT Article 21(2) in Japanese. The entire disclosures of these applications are hereby incorporated by reference herein.

This application is based upon and claims the benefit of priority from prior Japanese Patent Application No. 2007-039969, filed Jan. 24, 2007, the entire contents of which are incorporated herein by reference.

BACKGROUND OF THE INVENTION

1. Field of the Invention

The present invention relates to data conversion of a storage medium, and more particularly to a data conversion method of a specific area of a storage medium, which is associated with data in the storage medium, an apparatus and a program.

2. Description of the Related Art

Methods for converting data in a storage medium in a decryptable format in anticipation of, e.g. a theft of a storage medium such as a hard disk, include a method of encrypting data by using an encryption algorism or the like. The encryption generally falls into two categories, i.e. file encryption and disk encryption.

In the file encryption, encryption is executed in units of a file or a folder in an application layer on an operating system (OS).

On the other hand, in the disk encryption, encryption is executed in units of a sector at a lower level than a file system. In general, the entire disk is encrypted. The disk encryption is more advantageous than the file encryption in the case where the data in the disk is to be encrypted regardless of an operation user's intension, or in the case where the processing speed is taken into account.

Patent document 1: Jpn. Pat. Appln. KOKAI Publication No. 2005-172866, and

Patent document 2: Jpn. Pat. Appln. KOKAI Publication No. 2006-033326.

As described above, in the conventional disk encryption, the object of encryption is the entire disk. Consequently, a long time (about several hours) is needed when initial encryption is executed from a non-encrypted state, and in a case where the disk has a defect, there is such a problem that the initial encryption fails to be finished. In addition, while the initial encryption is being executed, there is such inconvenience that the associated computer terminal is not usable for work.

As a measure for avoiding such problems, it is thinkable that only a necessary region, which is used by data in the storage medium that meets a specific target condition, is set as an object of encryption while making use of the advantage of the disk encryption, for example, by encrypting only an actually used region. However, since the disk encryption is executed in the process at the lower level than the file system, at which level there is no concept of files, the conventional disk encryption is unable to selectively encrypt the region which is associated with data in the storage medium such as a file.

BRIEF SUMMARY OF THE INVENTION

In general, disk management in the OS is conceptually hierarchized, and a data access request, which is conceptually at a higher level than the file system, such as data access to the storage medium from an application, is decomposed into sector-unit requests at a lower level than the file system.

In the present invention, this scheme of disk management of the OS is utilized.

In the present invention, in addition to a module which executes data conversion at a lower level than the file system in the concept of hierarchy of disk management, a data conversion auxiliary module for specifying a disk region which becomes an object of data conversion is provided at a higher level than the file system.

If the data conversion auxiliary module has accessed and read data in the storage medium in a region in which data conversion is to be executed, the file system, which has received the data access request, refers to disk management information, decomposes the read request for reading the data in the storage medium into requests in units of a sector that is used by the data in the storage medium, and sends the request to a device driver.

The data conversion module captures the sector-unit read request from the file system to the device driver, stores the read-destination sector number, and transfers the process to the device driver. The data conversion module converts the data of the sector, which is returned from the device driver, in a decryptable format by using an encryption algorithm or the like, writes the conversion data in the sector, and returns the process to the file system.

By successively accessing and reading the data in the storage medium that is the object of data conversion in the data conversion auxiliary module, it becomes possible to execute data conversion of a specific region of the storage medium which is associated with the data in the storage medium.

In addition, by setting the degree of operation priority of the process of the data conversion auxiliary module in the OS, the degrees of operation priority between the data conversion process and the process of some other application can be balanced.

Specifically, according to a first aspect of the present invention, there is provided an information processing apparatus comprising: data access means, provided at a higher level than a file system in a disk management hierarchy, for executing data read access for reading out data stored in a storage medium; capturing means, provided at a lower level than the file system, for capturing data of a sector, which is read out by a sector-unit data read access request to a device driver, the data read access request being generated from the file system by the data read access; data conversion means for encrypting the captured data of the sector; and data write means for writing the encrypted data of the sector in the sector of the encrypted data.

BRIEF DESCRIPTION OF THE SEVERAL VIEWS OF THE DRAWING

FIG. 1 is a view showing the structure of an information processing apparatus according to an embodiment of the present invention;

FIG. 2 is a system configuration diagram mainly showing a data conversion auxiliary module;

FIG. 4 is a conceptual view of a data conversion information table;

DETAILED DESCRIPTION OF THE INVENTION

Figure 3:
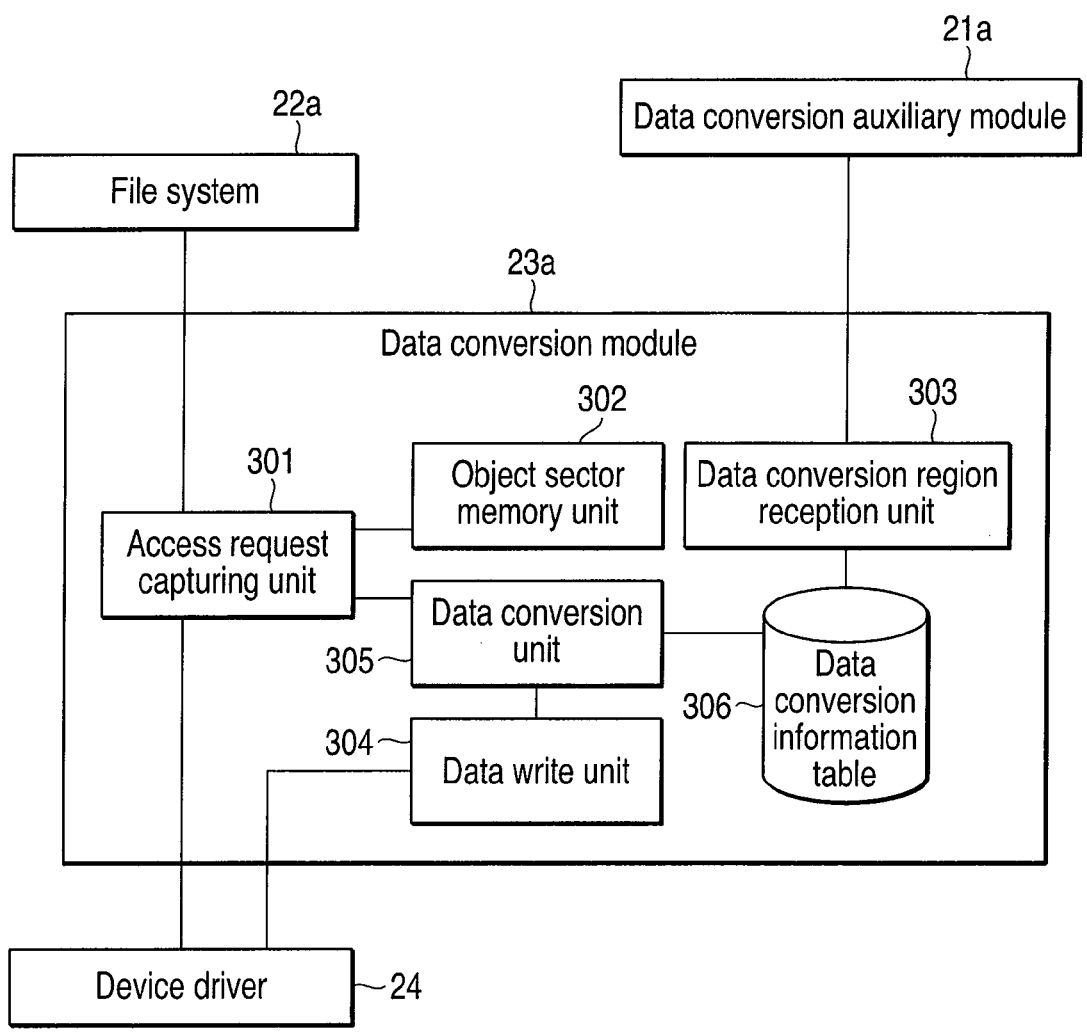
FIG. 3 is a system configuration diagram mainly showing a data conversion module.

An embodiment of the present invention will now be described with reference to the drawings.

FIG. 1 is a view showing the structure of an information processing apparatus according to the embodiment of the present invention.

As shown in FIG. 1, in the information processing apparatus 1, a CPU 12, a memory 13, an input unit 14 and a storage medium 15 are connected to a bus 11.

The CPU 12 cooperates with a first encryption/decryption program 21 and a second encryption/decryption program 23 which are stored in the storage medium 15, thereby executing a data conversion process according to the embodiment of the invention, and executing overall control of the information processing apparatus 1.

The memory 13 is used as a work area which is needed at the time of executing the first encryption/decryption program 21 and the second encryption/decryption program 23.

The input unit 14 is an interface for inputting data for specifying data which is to be subjected to the data conversion process, and is, for instance, a keyboard or a touch panel.

The storage medium 15 stores programs and data which are needed in the data conversion process according to the embodiment of the invention, and is, for instance, a hard disk drive (HDD) or a USB memory.

The storage medium 15 stores the first encryption/decryption program 21, an OS (operating system) 22, the second encryption/decryption program 23, and a device driver 24.

The first encryption/decryption program 21 is a program at an application level which is higher than a file system 22a, and controls the data conversion process at the application level according to the embodiment of the invention.

The first encryption/decryption program 21 includes a data conversion auxiliary module 21a. The data conversion auxiliary module 21a operates at a higher level than the file system in the disk management hierarchy, specifies a storage medium region that is an object of data conversion, and executes data read access for reading data in the storage medium and data write access for writing data in the storage medium.

The OS includes an API (Application Programming Interface) 22b which is an interface with the file system 22a for file management of the storage medium and with application programs. These file system 22a and API 22b are publicly known art.

The second encryption/decryption program 23 is a driver of a lower level concept than the file system 22a, and controls the data conversion process according to the embodiment of the invention at a lower concept level than the file system.

The second encryption/decryption program 23 includes a data conversion module 23a.

The data conversion module 23a operates at a lower level than the file system 22a, and executes processes such as data conversion and write of write data in the storage medium 15.

The data conversion module 23a includes a data conversion information table 23b. The data conversion information table 23b stores, in a correlated fashion, sector numbers of the storage medium 15, data conversion object flags which indicate whether sectors are objects of data conversion or not, and data conversion flags which indicate whether data is encrypted or not.

The device driver 24 is a driver for accessing the storage medium 15, and is publicly known art.

FIG. 2 shows the structure of the data conversion auxiliary module 21a. The data conversion auxiliary module 21a mainly comprises a data access unit 201, a disk management information acquisition unit 202, a setting read-in unit 203 and a data conversion region transmission unit 204.

The setting read-in unit 203 reads in the setting of objects and conditions of data conversion. The methods of the setting include, for example, a method in which setting is executed by a setting file and the setting file is read in, a method in which setting is input from a user interface, and a method in which setting is executed by another machine such as a server machine by communication and is read in.

Examples of the object of setting are as follows. As regards the selection of object regions of data conversion, examples of the object regions include a region which is used by data in the entire storage medium; a region of data in the storage medium, which is used or not used by the OS; a region of data in the storage medium, which is used or not used by a specific application; a region of specific data in the storage medium or a region of a storage location of the data; and a region of data in the storage medium in a specific drive. Examples of the conditions include the kind of storage medium, such as a computer terminal, a built-in hard disk, a USB memory or a USB hard disk, which is discriminated by a machine name, a MAC address or an IP address; the kind of disk management method (e.g. FAT: File Allocation Table); and the distinction as to whether the apparatus is a mobile PC or not.

The disk management information acquisition unit 202 scans disk management information such as file system information and partition information, and selects, according to the setting, data in the storage medium which becomes the object of data conversion. In addition, where necessary (for example, in the case where an additional data conversion region is designated), sector numbers, which are used by the data in the storage medium, are acquired on the basis of the disk management information.

The data access unit 201 accesses, via the API (Application Programming Interface) 22b and file system 22a of the OS 22, the data in the storage medium which is set to be the object of data conversion by the disk management information acquisition unit 202, and reads in the data stored in the storage medium. The access to the device driver 24 from the file system 22a is executed in units of a sector.

The data conversion region transmission unit 204, where necessary (for example, in the case where an additional data conversion region is designated), transmits the sector number, which is acquired by the disk management information acquisition unit 202 and is used by the data in the storage medium, to the data conversion module 23a via the API 22b and file system 22a of the OS 22.

FIG. 3 shows the structure of the data conversion module 23a. The data conversion module 23a mainly comprises an access request capturing unit 301, an object sector memory unit 302, a data conversion region reception unit 303, a data write unit 304, a data conversion unit 305 and a data conversion information table 306.

The access request capturing unit 301 captures a sector-unit (or cluster-unit) access request to the device driver 24 from the file system 22a. In the case where the access request is a data read access request, the data that is read out by the data read request is captured.

The object sector memory unit 302 stores the sector number of an access destination when the access request from the file system 22a to the device driver 24 has been captured.

The data conversion unit 305 executes data conversion (encryption) on the read-out data which is sent from the device driver 24 back to the file system 22a. In addition, in the case where the read-out data is encrypted, a decryption process of the data is also executed.

The data write unit 304 issues to the device driver 24 an instruction to write conversion data (encrypted data) to the sector that is stored in the object sector memory unit 302. In addition, at the time of data decryption of the storage medium, the data write unit 304 similarly issues to the device driver 24 an instruction to write decryption data.

The data conversion information table 306, as shown in FIG. 4, is a table for managing, with respect to each sector number, whether the associated sector is an object of data conversion, and whether data of the associated sector has been subjected to data conversion. In FIG. 4, as regards data conversion object information 402, "1" indicates an object, and "0" indicates a non-object. As regards data conversion information 403, "1" indicates a data-converted state, and "0" indicates a non-data-converted state.

The data conversion region reception unit 303, where necessary (for example, in the case where an additional data conversion region is designated), receives sector number information of a data conversion object, which is transmitted from the data conversion auxiliary module 21a, and reflects this information on the data conversion object flag 402 of the data conversion information table 306. Specifically, "1" is set in the case of the object of encryption.

The data conversion unit 305 sets "1", which indicates the object of encryption, in the data conversion object flag 402 corresponding to the sector number which has been accessed. In addition, in the case where the data, which has been encrypted by the data write unit 304, is written at the sector number which is accessed, the data conversion unit 305 sets "1", which indicates the encrypted state of data, in the data flag 403 corresponding to this sector number.

In the case where decryption of the storage medium is executed, the data conversion unit 305 sets "0" in the data conversion flag corresponding to the sector in which the decrypted data is written.

Figure 5:
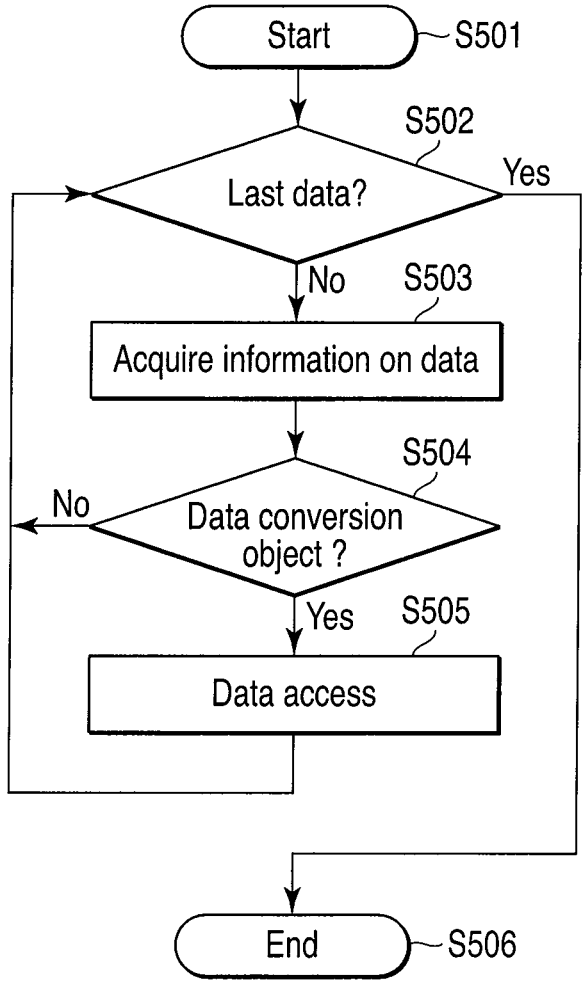
FIG. 5 is a flow chart at a data conversion time with respect to the data conversion auxiliary module.
Figure 6:
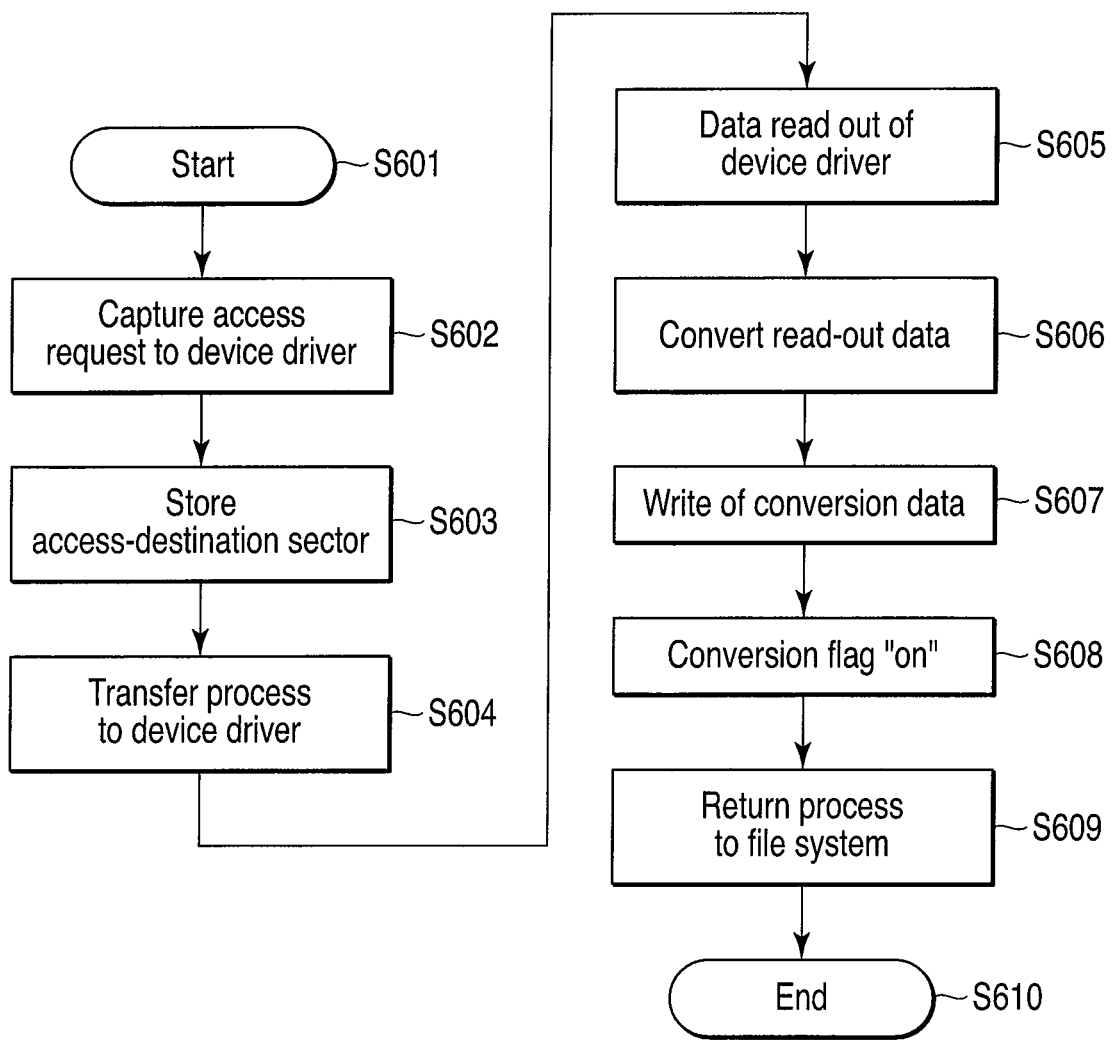
FIG. 6 is a flow chart at a data conversion time with respect to the data conversion module.

Next, referring to flow charts of FIG. 5 and FIG. 6, a description is given of the operation at the time of executing initial data conversion from the state in which no data conversion is executed in the storage medium.

With reference to FIG. 5, the operation of the data conversion auxiliary module 21a is described.

If the initial data conversion process is started, the data conversion auxiliary module 21a first reads in the settings of, e.g. the data conversion object and condition, by the setting read-in unit 203.

Subsequently, the disk management information is scanned, and with respect to all data in the storage medium, it is determined whether the data is the data conversion object which meets the setting condition that has been read in by the setting read-in unit 203. In the case where the data in the storage medium meets the setting condition (object/condition) of data conversion, the data access unit 201 executes data access (read access) to the storage medium. If the data in the storage medium fails to meet the setting condition (object/condition) of data conversion, no data access is executed to the storage medium.

In this process, in S502, it is determined whether the data is the last data of scan of the disk management information.

In the case of the last data in S502, the process ends in S506, and thus the initial data conversion process is finished.

In the case of not the last data in S502, the information of the next data in the storage medium is acquired in S503.

In S504, the information of the data in the storage medium, which is acquired in S503 is compared with the setting condition that is read in by the setting read-in unit 203, and it is determined whether the data is the object of data conversion.

If it is determined in S504 that the data in the storage medium is the object of data conversion, the API 22b is used in S505 to access the data in the storage medium, and executes read-in of the data in the storage medium.

If it is determined in S504 that the data in the storage medium is not the object of data conversion, data access to the storage medium is not executed, and the process returns to S502.

In the case where the data conversion region information is transmitted to the data conversion module 23a, where necessary (for example, in the case where an additional data conversion region is designated), the data conversion region transmission unit 204 transmits the sector number, which is used by the data in the storage medium, to the data conversion module 23a via the API 22b, instead of executing data access to the storage medium in S505 of the above-described process.

The transmission of the data conversion region information to the data conversion module 23a is executed in the case where it is more advantageous for the data conversion module 23a to execute data conversion or decryption of conversion data on the basis of the pre-transmitted data conversion object information 402.

Instead of transmitting the data conversion region information each time as described above, the information may be stored in the memory and the information may be transmitted at a time to the data conversion module 23a.

Referring to FIG. 6, the operation of the data conversion module 23a is described.

In the case where the data conversion auxiliary module 21a has executed data access to the storage medium in the above-described process, the file system driver, which has received the data access request for data access to the storage medium, refers to the disk management information, decomposes the access request to the data in the storage medium into sector units that are used by the data in the storage medium, and sends the access request to the device driver 24.

The data conversion module 23a captures the sector-unit access request from the file system to the device driver 24, stores the access-destination sector in the object sector memory unit 302, and transfers the process to the device driver 24. The data conversion module 23a further captures the data that is read out from the device driver 24, converts (encrypts) the captured data of the sector, and issues to the device driver 24 a request for writing the conversion data in the sector. Furthermore, the flag relating to the sector of the data conversion information table 306 is set to "1" (data-converted state), and the process is returned to the file system 22a.

Next, referring to the flow chart of FIG. 6, the operation of the data conversion module 23a is described.

In the above-described process, in S602, the access request capturing unit 301 captures the sector-unit access request from the file system 22a to the device driver 24.

In S603, the access-destination sector is stored in the object sector memory unit 302. The data conversion unit 305 sets "1", which is indicative of the object of conversion, in the data conversion object flag 402 corresponding to the accessed sector number in the data conversion information table 306.

In S604, the access request capturing unit 301 transfers the process to the device driver 24.

In S605, the data that is read out of the device driver 24 is captured.

In S606, the data conversion unit 305 converts (encrypts) the data of the sector, which has been returned. As the data conversion method, use may be made of an encryption algorithm which is generally made public.

In S607, the data write unit 304 issues to the device driver 24 a request for writing the converted data into the sector that is stored.

In S608, the data conversion unit sets 1 (data-converted state) in the flag corresponding to the sector in the data conversion information table 306.

In S609, the process is returned to the file system 22a.

As has been described above, by the cooperation of the data conversion auxiliary module 21a and data conversion module 23a, the initial conversion process from the state of the storage medium, in which data conversion is not executed, can be executed.

Instead of the process method illustrated in FIG. 6, use may be made of a method of successively executing data conversion on the sectors with respect to which the data conversion object flag is "1" (data conversion object).

In the case of decrypting the converted data on the storage medium, the data conversion information table 306 is referred to in the data conversion module 23a. If the flag of the data conversion information is "1", the data of the associated sector number is decrypted and the decrypted data is written in the storage medium. By successively executing this operation by scanning the sector numbers of the data conversion information table, data decryption on the storage medium can be executed.

In the meantime, if the degree of priority of the process of the data conversion auxiliary module 21a is set in the OS 22, the degree of priority of the initial data conversion process can be adjusted. In the case where the initial data conversion process is to be completed in a shortest possible time, the degree of priority of the process of the data conversion auxiliary module 21a is set at a high level, and the degree of priority of the initial data conversion process is increased.

Conversely, in the case where the initial data conversion is to be executed while some other application is being executed, even if a longer time is consumed, the degree of priority of the process of the data conversion auxiliary module 21a is set at a low level, and the degree of priority of the initial data conversion process is lowered.

The present invention is not limited to the above-described embodiments. At the stage of practicing the invention, various modifications may be made without departing from the spirit of the invention. The embodiments may properly be combined and implemented as much as possible, and in such cases advantageous effects as combined can be obtained. Further, the embodiments include various inventions at various stages, and various inventions may be derived by properly combining structural elements disclosed in the embodiments. For example, in the case where an invention is derived by omitting some structural elements from all the structural elements disclosed in the embodiments and the derived invention is implemented, the omitted parts are properly supplemented by well-known art.

By the above-described invention, data conversion can be executed on a specific region of a storage medium, which is associated with data in the storage medium. Thereby, data conversion of a necessary region of the storage medium can be executed at high speed, without being affected by, for example, a defect of a disk, and the security of the storage medium can be made stronger.

In addition, by making adjustable the degree of operation priority of the process for executing data conversion, it becomes easier to make use of some other application, while executing the data conversion.

The embodiments of the invention in which an exclusive property or privilege is claimed are defined as follows:

1. An information processing apparatus including a computer processor configured to provide a data conversion module, and a data conversion auxiliary module, wherein the data conversion auxiliary module comprises:

a setting reading unit configured to read a setting condition of data conversion when an initial data conversion is started, the setting condition of data conversion designating a type of non-transitory computer-readable medium of the information processing apparatus and object regions to be converted, from a state in which no data conversion is executed in the non-transitory computer-readable medium designated by the setting condition, wherein the designation of object regions to be converted includes a data conversion information table which stores, in a correlated fashion, a sector number of the non-transitory computer-readable medium, a data conversion object flag which indicates whether a sector is an object of data conversion or not, and a data conversion flag which indicates whether data within the sector is encrypted or not, wherein the sector is smaller than an entire partition;

a setting condition determination unit configured to determine whether all of data stored in a non-transitory computer-readable medium of the information processing apparatus meets the setting condition of data conversion read by the setting reading unit by scanning disk management information including file system information and partition information; and a data access unit configured to execute read access of the data, which is determined as meeting the setting condition in the designated non-transitory computer-readable medium;

wherein the data conversion module comprises:

a capturing unit configured to capture data of a sector, which is read out by a sector-unit data read access request to a device driver, the data read access request being generated from a file system by read access of data by the data access unit;

a data conversion unit configured to encrypt the data of the sector captured by the capturing unit; and a data write unit configured to write the data of the sector encrypted by the data conversion unit in the sector of the captured data.

2. The information processing apparatus according to claim 1, wherein the data conversion unit includes a unit configured to decrypt the encrypted data of the sector which is written by the data write unit.

3. The information processing apparatus according to claim 1, wherein the computer processor is further configured to provide a setting unit configured to set a degree of operation priority of a process by the data access unit in an operating system of the information processing apparatus.

4. The information processing apparatus according to claim 1, wherein the capturing unit sets the data conversion object flag at a value which indicates that the sector is the object of data conversion, in a case where the sector that is the object of data conversion is captured from the file system, and the data write unit sets the data conversion flag of the data conversion information table at a value which indicates that the data is encrypted, in a case where the encrypted data of the sector has been written.

5. A data conversion method in an information processing apparatus including one or more processors configured to provide a data conversion module and includes a capturing unit, a data conversion unit, and a data write unit, and is also configured to provide a data conversion auxiliary module and includes a setting reading unit, a setting condition determination unit, and a data access unit, the data conversion method comprising:

reading a setting condition of data conversion by the setting reading unit when an initial data conversion is started, the setting condition of data conversion designating a type of non-transitory computer-readable medium of the information processing apparatus and object regions to be converted, from a state in which no data conversion is executed in the non-transitory computer-readable medium designated by the setting condition, wherein the designation of object regions to be converted includes a data conversion information table which stores, in a correlated fashion, a sector number of the non-transitory computer-readable medium, a data conversion object flag which indicates whether a sector is an object of data conversion or not, and a data conversion flag which indicates whether data within the sector is encrypted or not, wherein the sector is smaller than an entire partition;

determining whether all of data stored in a non-transitory computer-readable medium of the information processing apparatus meets the setting condition of data conversion read by the setting reading unit by scanning disk management information including file system information and partition information by the setting condition determination unit;

executing read access of the data which is determined as meeting the setting condition in the designated non-transitory computer-readable medium;

capturing data of a sector, which is read out by a sector-unit data read access request to a device driver by the capturing unit, the data read access request being generated from a file system by read access of the data by the data access unit;

encrypting the data of the sector captured by the capturing unit by the data conversion unit; and writing the data of the sector encrypted by the data conversion unit in the sector of the captured data by the data write unit.

6. The data conversion method according to claim 5, further comprising decrypting the encrypted data of the sector which has been written by the data write unit by the data conversion unit.

7. The data conversion method according to claim 5, wherein the setting condition includes information representing a degree of operation priority of a process by the data access unit which has been set in an operating system of the information processing apparatus.

8. A non-transitory computer-readable medium having computer-executable instructions stored thereon that, if executed by a processor of an information processing apparatus, cause the information processing apparatus to provide a data conversion module and a data conversion auxiliary module, wherein the data conversion module includes a capturing unit, a data conversion unit, and a data write unit; and wherein the data conversion auxiliary module includes a setting reading unit, a setting condition determination unit, and a data access unit, and wherein the instructions, if executed by the processor of the information processing apparatus, cause:

the setting reading unit to read a setting condition of data conversion when an initial data conversion is started, the setting condition of data conversion designating a type of non-transitory computer-readable medium of the information processing apparatus and object regions to be converted, from a state in which no data conversion is executed in the non-transitory computer-readable medium designated by the setting condition, wherein the designation of object regions to be converted includes a data conversion information table which stores, in a correlated fashion, a sector number of the non-transitory computer-readable medium, a data conversion object flag which indicates whether a sector is an object of data conversion or not, and a data conversion flag which indicates whether data within the sector is encrypted or not, wherein the sector is smaller than an entire partition;

the setting condition determination unit to determine whether all of data stored in a non-transitory computer-readable medium of the information processing apparatus meets the setting condition of data conversion read by the setting reading unit by scanning disk management information including file system information and partition information;

the data access unit to execute read access of the data, which is determined as meeting the setting condition in the designated non-transitory computer-readable medium;

the capturing unit to capture data of a sector, which is read out by a sector-unit data read access request to a device driver, the data read access request being generated from the file system by read access of the data by the data access unit;

the data conversion unit to encrypt the data of the sector captured by the capturing unit; and the data write unit to write the data of the sector encrypted by the data conversion unit in the sector of the captured data.

* * * * *